United States Patent Office 3,541,726
Patented Nov. 24, 1970

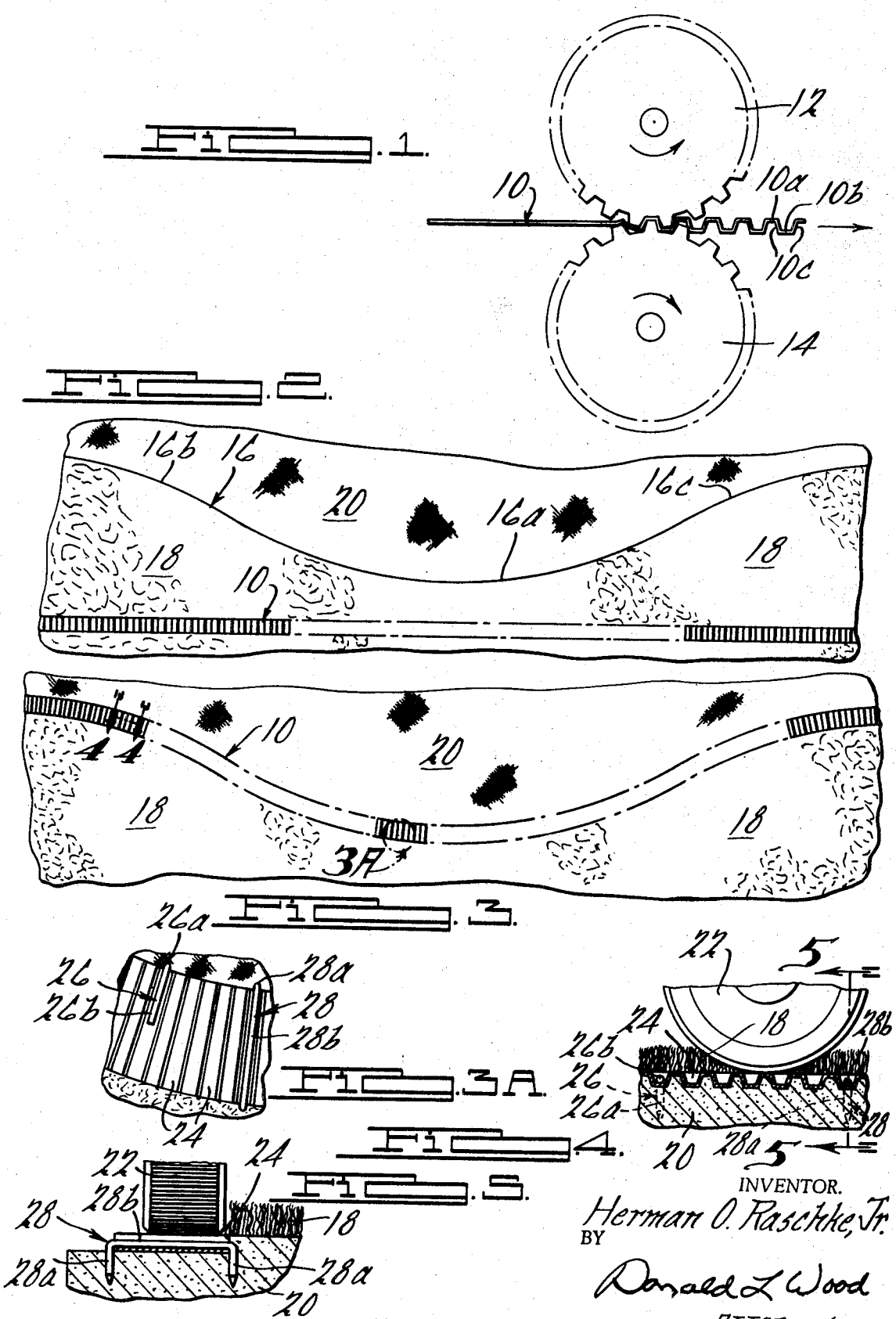

3,541,726
LAWN EDGING
Herman O. Raschke, Jr., 30630 Austin Drive,
Warren, Mich. 48092
Filed Jan. 8, 1968, Ser. No. 696,324
Int. Cl. A01g 1/00; E01c 1/00
U.S. Cl. 47—33                                    6 Claims

ABSTRACT OF THE DISCLOSURE

A lawn edging comprising a strip of transversely corrugated sheet metal adapted to be selectively crimped and expanded along the opposite edges of the strip to impart a curved configuration to the strip to selectively match the configuration of the lawn border to be edged; the thus curved strip is laid flat on the ground along with the lawn border and impacted into the ground. Separate L- or U-shaped anchor members for the strip are also disclosed.

BACKGROUND OF THE INVENTION

This invention relates to lawn edging apparatus and to methods of providing lawn edging. Various forms of lawn edging have been proposed and/or are presently available. Various methods of providing lawn edging have also been proposed. The available or proposed systems of lawn edging have several disadvantages. Some of the proposed systems are expensive to produce, requiring a plurality of intricate, difficult to fabricate components. Others are extremely difficult to install, requiring the time consuming and arduous operation of digging a trench in which to bury the edging. Still others lose their effectiveness as lawn edging after short periods of use or exposure, selectively working upwardly out of the soil as the latter undergoes seasonal or climatic changes.

SUMMARY OF THE INVENTION

It is an object of the present invention to provide an improved lawn edging apparatus which will be inexpensive to produce, easy to install, and extremely durable in service.

Another object is to provide an improved method for establishing an edging along a lawn border.

The lawn edging apparatus of the invention includes a strip of flexible material which has been transversely corrugated.

According to the invention, the corrugated strip is selectively crimped and expanded along its opposite edges to impart a curved configuration to the strip matching that of the lawn border to be edged; the thus curved strip is thereafter laid flat on the ground along the lawn border and suitably anchored to the ground. The anchoring may be accomplished by impacting the strip into the ground to pack earth into the corrugations to resist lateral and longitudinal displacement. Separate anchor members are also provided to assist the impacted earth in precluding displacement of the strip. These anchor members are provided at spaced locations along the strip and include a stake or ground engaging portion adapted to be driven into the ground along the strip, and a strip engaging portion adapted to overlie and engage the upper surface of the strip to maintain the latter in its position flat on the ground.

According to a further feature of the invention, the individual ridges of the corrugated strip have a generally trapezoidal form, whereby to provide a relatively large, angular volume into which the earth may be impacted and provide a relatively smooth upper surface to serve as a roadway for a wheeled lawn care implement.

Other objects, features, and advantages of the invention will be apparent from the detailed description of the preferred embodiment.

BRIEF DESCRIPTION OF THE DRAWINGS

A preferred embodiment of the invention is illustrated in the accompanying drawing. In the drawing:

FIG. 1 is a view of a simple apparatus whereby the corrugated strip of the invention may be formed;

FIGS. 2 and 3 illustrate sequential steps in the installation of the corrugated strip of FIG. 1;

FIG. 3A is a view on an enlarged scale of a portion of FIG. 3;

FIG. 4 is a fragmentary cross sectional view taken on line 4—4 of FIG. 3; and

FIG. 5 is a cross sectional view taken on line 5—5 of FIG. 4.

DETAILED DESCRIPTION OF THE PREFERRED EMBODIMENT

The strip material for practicing the invention may consist of any suitable strip stock. Sheet metal stock having a thickness of approximately .016 inch and a width if approximately three inches has been found to be suitable for most applications. The strip material, seen at 10 in FIG. 1, may be corrugated in any known manner as for example by passing it progressively between counter rotating intermeshing gear teeth 12, 14. The gear teeth or other corrugating means are designed to impart a generally quadrilateral form to the individual corrugations of the strip with the top wall 10a of each ridge being substantially flat and having a substantial extent in a direction lengthwise of the strip and the bottom wall 10b of each groove having a similar substantial lengthwise extent. The side walls 10c of each ridge angularly intersect the top wall and coact with the top wall to define a generally quadrilateral area therewithin. Side walls 10c may intersect top wall 10a generally at right angles or, as in the disclosed embodiment, may be splayed outwardly somewhat to define a generally isosceles trapezoidal area therewithin.

The thus corrugated strip is then laid on the ground generally adjacent and along the border 16 of the lawn 18. This step is seen in FIG. 2. The area 20 from which the lawn is to be separated by the edging may comprise a garden area, an earth area, or a paved area such as a sidewalk or driveway.

The strip 10 is now selectively crimped and expanded along its opposite lengthwise edges to impart a curved configuration to the strip matching the configuration of the lawn border to be edged. For example, in the area of the generally concave lawn border portions 16a, the corrugations along the lengthwise edge of the strip nearest the lawn border are crimped or pinched to decrease the length of that edge of the strip while the corrugations along the remote lengthwise edge of the strip are expanded or spread apart to increase the length of that edge of the strip. The concave curvature of lawn border portion 16a is thus selectively matched by strip 10, with the strip assuming a fan like configuration as best seen in FIG.

3A. Conversely, in the area of the generally convex lawn border portions 16b and 16c, the corrugations along the rear edge of the strip are expanded and those along the remote strip edge are pinched.

The thus selectively curved strip is then placed along and over the lawn adjacent the lawn border as seen in FIG. 3 and suitably anchored in place in a position flat on the ground. Anchoring is achieved by pressing the flat strip downwardly into the ground to impact earth into the trapezoidal areas beneath the successive ridges of the strip.

This impacting may be accomplished, for example, by first wetting the ground and lawn in the area to be edged and thereafter pressing the strip into the ground by the use of a foot, a roller, a heavy wheeled vehicle, or a suitable tamping tool. The strip should be driven into the ground to a depth, as seen in FIG. 4, where the top walls 10a of the strip are generally at the level of the ground from which the grass of the lawn is growing. In this position, the successive top walls of the successive ridges coact to define a narrow roadway for the wheel 22 of a suitable lawn care implement such, for example, as a lawn mower.

Displacement of the strip from its impacted position is firmly resisted by the earth packed into the successive trapezoidal areas underlying the ridges; specifically the earth packed against the nearly vertical side walls 10c effectively impedes displacement of the strip in the direction of its length, the vertical earth wall 24 on the lawn side of the strip precludes lateral displacement of the strip toward the lawn, the friction provided by the large area interface of the strip with the earth as defined by the top walls 10a, bottom walls 10b, and side walls 10c resist lateral displacement of the strip in the direction away from the lawn, and this same friction, together with the resistance of the earth and grass that unavoidably intrude into the grooves of the strip during the impacting operation, serves to resist upward displacement of the strip.

The invention also contemplates the provision of separate anchor members to assist the impacted earth in holding the strip in place. These anchor members may take various forms. For example, and as best seen in FIGS. 3A and 4, they may comprise L-shaped members 26 each having a first, stake portion 26a adapted to be driven into the ground adjacent the edge of the strip remote from the lawn and a second, strip engaging portion arranged at right angles to stake portion 26a and adapted to extend transversely of the strip within a groove provided between successive ridges of the strip. L-shaped members 26 thus serve to effectively pin the strip to the underlying ground surface and also serve to positively preclude lateral movement of the strip away from the lawn. The members 26 may be formed of suitable wire material.

In certain critical areas, for example, in the area of a sharp radius of curvature of the strip, the anchor members may comprise U-shaped members 28, best seen in FIGS. 3A and 5. U-shaped member 28 is adapted to straddle the strip with the opposite legs 28a of the U providing stake portions adapted to be driven into the ground at opposite edges of the strip to position the bight portion 28b of the U within a groove of the strip. U member 28 thus serves to clamp the strip to the underlying ground surface and also serves to preclude lateral displacement of the strip in either direction. U-shaped member 28 may also be formed of a suitable wire material. L-shaped members 26 may be selectively mixed with U-shaped member 28 with the particular member employed at any given location along the strip determined by the degree and the direction of lateral restraint desired.

Although the invention has been described in detail with respect to its use along a curving lawn border, it will be apparent that the corrugated strip of the invention may also be utilized along straight lawn borders; when used along straight lawn borders, the step of selectively crimping and expanding the strip is eliminated while the succeeding steps of installing, impacting and anchoring are carried out in the manner previously described. The strip of the invention may also be used along vertical wall surfaces, such, for example, as building walls, and fences. When thus used, the strip is selectively curved, if necessary, to match the configuration of the vertical wall surface and is thereafter laid along and up against the vertical wall surface to provide an edging for the lawn and a roadway along the vertical wall surface for the wheel of a lawn care implement. The strip of the invention may also be used beneath fences where it runs along and straddles the fence line and serves to impede grass growth beneath the fence and provides an implement roadway on both sides of the fence for convenience of adjacent property owners. In such applications, the strip is preferably six inches or more wide.

The edging apparatus of the invention will be seen to provide an effective, easily installed, and durable edging for a lawn border; in addition, it provides a smooth, well defined roadway for the outer wheel of lawn care equipment, precluding the necessity of running this outer wheel over the uneven, unpredictable surface of the adjacent earth or garden area, eliminating the problem of scarring or skinning the edge of the lawn where the adjacent earth or garden surface is too far below the level of the lawn, and precluding damage to vegetation in the garden area by the wheel of the lawn care implement.

While a preferred embodiment of the invention has been illustrated and described in detail, it will be apparent that various changes and modifications may be made in the disclosed embodiment without departing from the scope or spirit of the invention as defined in the appended claims.

I claim:

1. A lawn edging element comprising a strip of metal of substantial length and realtively narrow width which is transversely corrugated to form a succession of alternate ridges and grooves with the top wall of the ridges being substantially flat and having a significant extent in the direction of the length of the strip and with the side walls of each ridge angularly intersecting the top wall and extending downwardly therefrom to coact with the top wall to form a generally quadrilateral area beneath each ridge into which earth may be impacted to impede displacement of the strip when the strip is laid flat on the ground along a lawn border and pressed downwardly into the ground, said metal strip having a thickness sufficiently thin to allow selective crimping and expansion of the strip along the opposite edges of the strip and the metal material of said strip having a plasticity such as to cause said strip to take a permanent set in response to such crimping and expansion and thereby enable the strip to achieve and hold a curved configuration selectively matching the configuration of the lawn border.

2. A lawn edging element according to claim 1 wherein said strip is formed of sheet metal.

3. A lawn edging element according to claim 1 wherein said metal strip has a width of approximately three inches and a thickness of approximately one sixty-fourth of an inch.

4. A lawn edging element according to claim 1 wherein said metal strip has a width greater than two inches and less than five inches.

5. A lawn edging element according to claim 1 wherein said side walls splay outwardly from said top wall to define a generally trapezoidal area beneath each ridge.

6. A lawn edging element according to claim 1 wherein each of said grooves has an extent in the direction of the length of said strip sufficient to accommodate an anchor member transversely extending therewithin, whereby said strip may be anchored to the ground by such anchor members received in selected grooves of the strip.

References Cited

UNITED STATES PATENTS

| | | | |
|---|---|---|---|
| 1,584,589 | 5/1926 | Adams | 47—32 |
| 1,844,051 | 2/1932 | Allen | 47—9 |
| 1,977,021 | 10/1934 | Spencer | 47—33 |
| 1,983,373 | 12/1934 | Horton | 273—31 |
| 1,986,941 | 1/1935 | Pearson | 273—31 |
| 2,092,183 | 9/1937 | Rehfeld | 47—32 XR |
| 2,143,461 | 1/1939 | Waring | 47—9 |
| 3,366,022 | 1/1968 | Mock | 94—17 XR |

ROBERT E. BAGWELL, Primary Examiner

U.S. Cl. X.R.

94—1; 161—133; 273—31